Jan. 30, 1962

H. M. BROWN 3,018,659

YARN TESTING DEVICE

Filed April 26, 1957

INVENTOR.
Hugh M. Brown.
BY Ralph B. Stuart
Attorney.

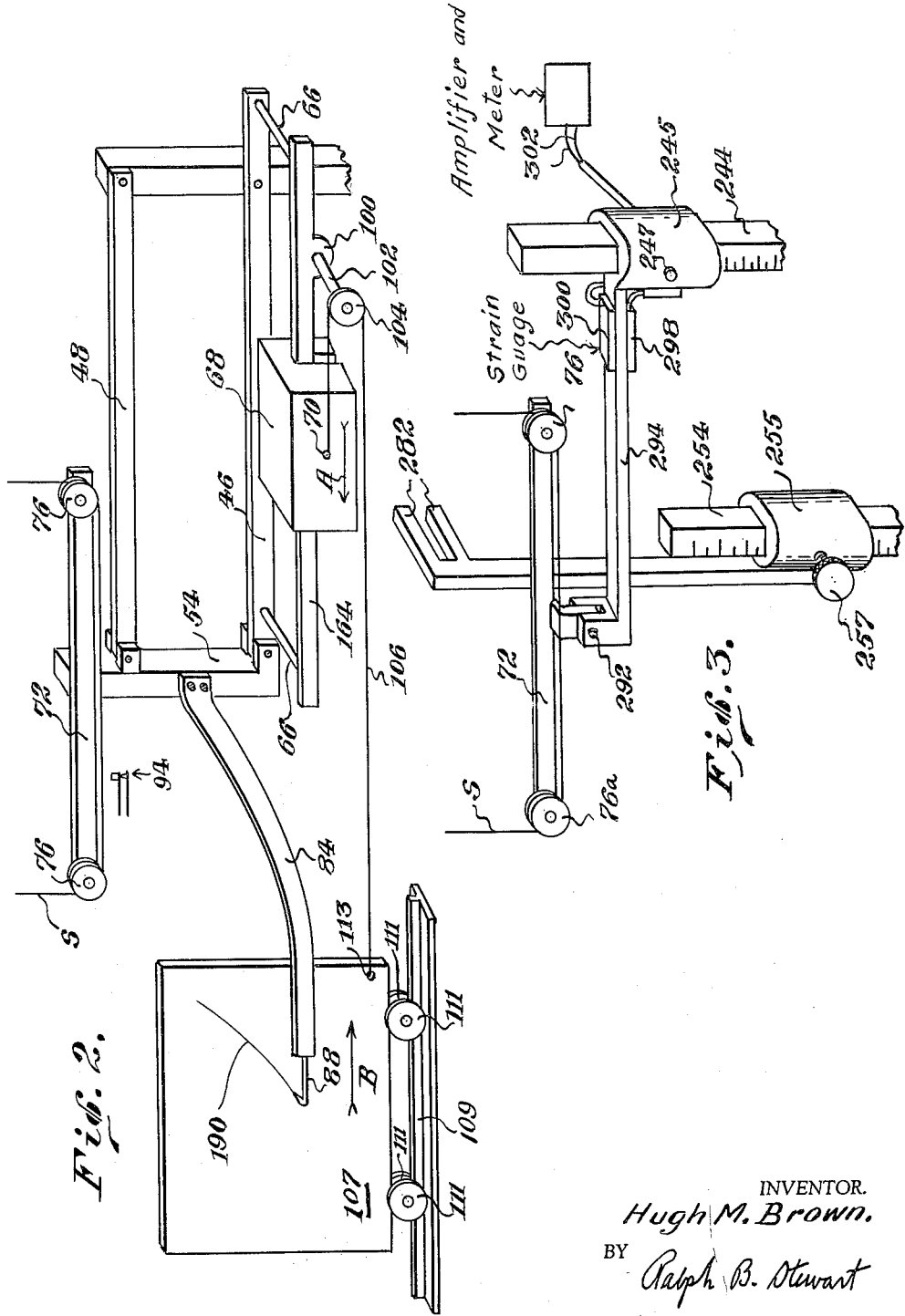

Jan. 30, 1962 H. M. BROWN 3,018,659
YARN TESTING DEVICE
Filed April 26, 1957 3 Sheets-Sheet 3

Tracings of Stress Strain Curves drawn by the Continuous Winding Tester.

Tracings of Stress Strain Curves drawn by the Instron Tester.

INVENTOR.
Hugh M. Brown.
BY Ralph B. Stewart
Attorney.

3,018,659
YARN TESTING DEVICE
Hugh M. Brown, Clemson, S.C., assignor to Clemson Agricultural College of South Carolina, Clemson, S.C., a corporation of South Carolina
Filed Apr. 26, 1957, Ser. No. 655,264
2 Claims. (Cl. 73—95.5)

This invention relates to a yarn testing device and more particularly to a device for instantaneously and continuously measuring variations in the elongation of a running length of a strand of yarn under a predetermined load and for recording such variation. In the device of this invention, a strand of yarn is passed in a loop from an unwinding or supply reel or bobbin to a winding or take-up reel or bobbin. In its passage, the yarn is engaged by the testing device of this invention by means of which a measure of variations in the elongation of the yarn under a predetermined load is obtained and traced on a travelling record sheet.

An object of this invention is to provide means for continuously noting variations in the elongation of a running yarn or other strand under predetermined load conditions.

Another object is the provision of means for passing a running strand through a testing zone and for loading the running strand in the testing zone to a predetermined amount and for noting variations in the elongation of such strand as it passes through the testing zone.

Another object is to provide means for conveying a running strand through a testing zone without slippage.

An additional object of this invention is the provision of means to temporarily remove the tension on a running strand to avoid undue elongation or rupture thereof.

A still further object of this invention is the provision of means for obtaining a stress-strain curve on a running strand.

Yet another object is the provision of means to measure the force applied to a running strand in producing a constant elongation.

The manner of accomplishing the above and other objects will become apparent from the following specification and the accompanying drawings wherein like reference characters indicate like parts throughout the several figures.

In the drawings,

FIGURE 1 is a diagrammatic perspective view showing the essential parts of one form of my machine for measuring and recording the variations in elongation of a running strand;

FIGURE 2 is a similar view of a portion of the machine of FIGURE 1, modified for obtaining a stress-strain curve on a running strand;

FIGURE 3 is a similar view of a portion of the machine for measuring the force required to produce constant elongation of a running strand.

Figure 4A:
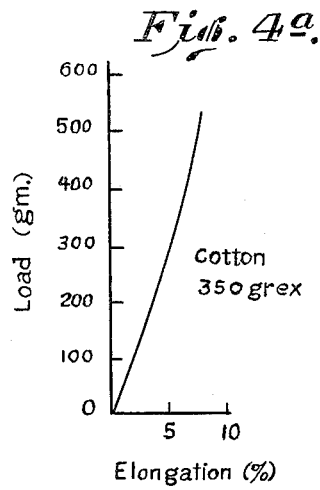
FIGS. 4a, 4b, 4c and 4d are curves comparing the results obtained with this machine with those obtained by machines operating on fixed lengths of a strand.

Referring to FIG. 1, a strand s extends from a suitable source to a conventional tension device T then around the input snubbing rollers 10 and 12. The roller 10 is mounted on a shaft 14 which carries a worm gear 16 meshing with a worm 18 on a drive shaft 20 connected to a suitable source of power. Snubber roll 12 is driven in the same direction as the roll 10 by suitable means such as belt 22 running in grooves formed in the two rolls. The axes of the rolls 10 and 12 are arranged at a slight angle to each other so that the yarn advances across the roll faces and does not wind on itself as would be the case with a single roll or drum. The shaft 20 carries a cone pulley 24 connected by a shiftable belt 26 with a reversed cone pulley 28 on a shaft 30 having thereon a worm 32 meshing with a worm gear 34 on a shaft 36. The shaft 36 carries a roll 38 similar to the roll 10. Roughly paralleling roll 38 and spaced slightly therefrom is a roll 40 similar to roll 12. Roll 40 is driven from roll 38 by belt 42. The axes of the rolls 38 and 40 are arranged at a slight angle to each other to prevent the yarn or strand from piling up, as explained above for rolls 10 and 12. The rolls 38, 40 shall be called herein the output snubbing rolls. The snubbing rolls 10, 12 and 38, 40 may be of hard metal or they may be of any suitable plastic; the surfaces of these rolls may be smooth, or they may be treated or covered with a suitable material to increase the friction between the strand and the surface without damage to the yarn.

The strand s takes several turns or loops about the input rolls 10, 12 and passes through a loop, formed by grooved pulleys 76 and 76a, to the output rolls 38 and 40, about which it makes several turns or loops and passes thence to a winding or take-up roll W. In each case the strand travels longitudinally over the rolls by virtue of the inclinations of the axes of the pairs of rolls as above described. The several loops or truns of the strand about the pairs of rolls 10 and 12, 38 and 40 enables the rolls to get a firm grip on the strand and prevents slippage of the strand on the rolls.

The drive through the cone pulleys 24, 28 is such that the rolls 38, 40 normally feed faster than the rolls 10, 12 to elongate the strand passing therebetween, and the percentage elongation is governed by the position of the belt 26.

The idler pulleys 76 and 76a are mounted on a movable support by which a load is applied to the loop of yarn or strand passing around these pulleys. This movable support is mounted upon a vertical frame member or post 44 and includes a pair of substantially parallel horizontal beams 46 and 48 pivotally connected to post 44 by means of pins 50 and 52, respectively. At the opposite ends of the beams 46 and 48, an upright bar 54 is pivotally connected to the beams 46, 48 by means of pins 60, 62, to form a parallelogram mounting of bar 54 from post 44. A slide-bar 64 is connected to the beam 46 in parallel relation therewith by means of dowels or rods 66 and 66 extending laterally from beam 46, the slide bar being of substantially the same length as the beam 46. A weight 68 is slidably mounted on the slide bar 64 and may be held in adjusted position by a screw 70. As shown in the drawing, beam 46 and slide bar 64 extend beyond the axis of pivot pin 50 so that weight 68 may be moved to a position to fully counter-balance the weight of upright 54 and all parts carried by it.

Grooved pulleys 76 and 76a are mounted at opposite ends of a horizontal cross-bar 72 which is rigidly secured to the upper end portion of upright 54. The strand s in passing from the input snubbing rolls 10, 12 to the output snubbing rolls 38, 40 passes under the rollers 76 and 76a and forms a loop where a predetermined tension or load is imposed on the strand by the weight 68. The position of the weight 68 determines the amount of load applied to the loop, which remains substantially constant for any given position of the weight, provided the beams 46 and 48 remain substantially horizontal. This is by virtue of the parallelogram support for the cross-bar 72 carrying the loop pulleys 76 and 76a. The device operates as a beam-balance for applying an adjustable load to the loop of yarn engaged by pulleys 76 and 76a.

Variations in the size or strength of the strand s from point to point will appear as variations in the elongation thereof under constant load. Elongation of the strand is evidenced by the lowering of the position of upright 54 and cross-bar 72 supporting pulleys 76 and 76a. If the yarn is removed from the loop by rolls 38—40 at the same rate that rolls 10—12 supply new yarn to the loop, under conditions of elongation the loop would progressively increase in size until beams 46—48 would depart substantially from a horizontal position. In order to keep the vertical movement of upright 54 within a small range, provision is made to control the speed of output rolls 38—40 by the movement of upright 54, so that a given elongation of the loop increases the speed of the output rolls 38—40 to a value where the size of the loop remains constant. This is accomplished by varying the relative speeds of the snubbing rolls 10—12 and output or drafting rolls 38—40 in response to vertical movement of upright 54. Such an arrangement includes a bracket 78 attached to or formed integrally with the bar 54, and a vertically adjustable rod 80 is carried by the bracket 78 and carries a belt-shifting fork 82 positioned to engage the belt 26, any slight variation in the elongation of the strand s will be translated into a displacement of the upright 54 and a corresponding shifting of the belt 26 to a position where the size of the loop will be kept substantially constant, assuming a uniform strand and a constant load. The size of the loop will change with changes in the strand or in the load.

A record of variations in the elongation of a strand s, under constant load, as expressed by movement of the arm 72, may be had by tracing a graph on a travelling record strip R. For this purpose, an arm 84 is attached at one end by suitable fasteners 86 to the bar 54. At the other end of the arm 84 there is a stylus 88 which contacts the strip R to trace the graph 90 thereon. The strip R may be moved at a speed correlated to the normal speed of travel of the strand so that the graph will provide a complete record of the elongation in different linear sections of the strand, and by providing suitable indicia on the record strip it will be easy to locate the particular linear section of the strand corresponding to a particular section of the record.

In order to prevent rupture or damage to the strand s due to too great an elongation at a weak spot, an electromagnet 92 is placed near the arm 72 in a position to lift the arm and remove the load from the loop.

Below the arm 72 there is placed a switch 94 which may be positioned to be closed when the arm 72 moves too far when a weak section of the strand moves into the loop. When the switch 94 is closed a circuit from the battery or other source 96 is completed through the ground, as diagrammatically shown, to the electromagnet 92. Once magnet 92 has lifted arm 72, it is desirable to hold the arm in lifted or partially lifted position for a short time so that the weak section of the strand will have moved out of the loop before the full load is reapplied. This may be accomplished by making magnet 92 of the slow-release type, or by providing a suitable dash-pot on arm 72. The electrical circuit above outlined may include conventional means to stop the operation of the machine under certain conditions, such as excessive elongation. A suitable counter may be included in the magnet circuit to count the number of imperfections.

Figure 4B:
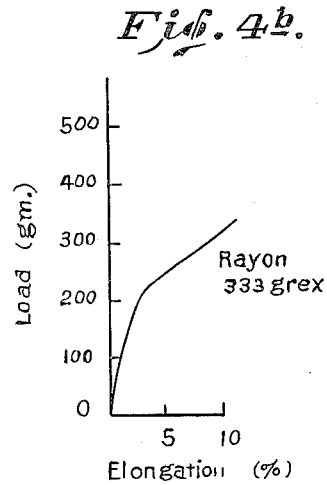

In FIG. 2 there is shown only a portion of the device including a modification for producing a stress-strain curve of the yarn in the loop under a varying load. The yarn may be running, or it may be a sample length of non-running yarn. Weight 68 is moved in a manner to impose a continuously variable load on the loop of yarn or strand. Movement of the weight may be automatically accomplished by means not shown but well known in the weighing and testing art, an arrow A showing the motion and direction thereof. As the weight moves in the direction indicated by the arrow, the arm 72 will impose greater load on the strand loop, increasing the elongation thereof. This will result in a lowering of the arm 72, and the stylus 88 will draw the stress-strain curve 190 if the chart 107 is simultaneously moved in a horizontal direction. For this purpose, chart 107 is mounted to move along the horizontal track 109 by means of the supporting rollers 111 and the movement is controlled by cable 106 connecting the chart with weight 68 and passing about the loose pulley 104 mounted on a shaft 102 which extends laterally from a downwardly extending bracket 100 attached to the arm or slide-rail 164. Movement of the weight in the direction of the arrow A causes the chart 107 to move in the direction of the arrow B. As the stylus moves downwardly, the chart 107 moves to the right as seen in FIG. 2, and the downwardly inclined curve 190 is drawn as a stress-strain curve. By slowly moving the weight along the load beam 164 from zero load upward, a wavy stress-strain curve is drawn. The oscillations caused by the variations in elongation are superimposed on what would be a smooth curve if the yarn were uniform. To eliminate long range variations in the yarn the curve can be traced several times for different portions of the yarn. The several tracings would parallel each other covering an area through which can be drawn an average curve. Of course the machine cannot produce curves extending to the breaking point of the yarn without becoming unthreaded. Typical curves drawn by the machine are shown in FIGS. 4a and 4b.

It is possible to arrange for the weight and chart to be moved back and forth automatically so that the stress-strain characteristics of long lengths of yarn can be displayed without continuous attention of an operator.

If the belt guide is removed, stress strain curves can be taken with the yarn stationary by simply moving the weight along the beam, and in this case the load could be increased sufficiently to obtain the breaking strength. Before curves for static tests are made, the yarn must be run through at zero tension before each break. By adding suitable jaws the machine could be used for making standard yarn breaks with definite gage lengths.

In FIG. 3 is shown a modification by which FIGURE 1 may be adapted to measure the force or load required to produce a predetermined elongation. Here, the belt-shifting fork 282 is mounted for vertical adjustment on a stationary bar 254 by means of the clamp 255 and the set screw 257.

The fork 282 is adjusted to place the belt 26 in a position to produce a suitable predetermined percentage elongation. The loop-forming arm 72 carrying pulleys 76 and 76a is pivotally mounted at 292 on one end of a strain-gauge bar 294, the other end of which is rigidly connected with a slide-sleeve 245 slidably carried by upright 244 and which may be clamped in any adjusted position by set screw 247. A pair of strain-sensitive resistive elements 298 and 300 are carried by bar 294 and are connected by conductors 302 to a suitable amplifier and recorder whereby the force required to produce a predetermined elongation of the strand is measured and recorded.

Figure 4C:
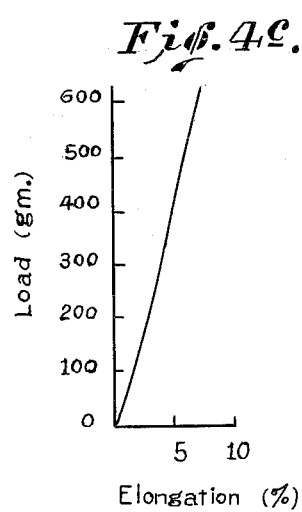
Figure 4D:
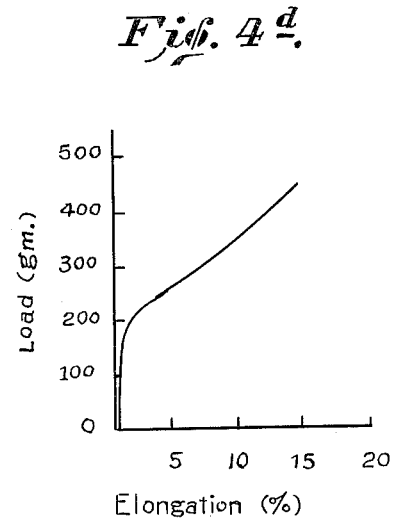

The curves in FIGS. 4a and 4b are examples of tests on two types of textile strand as taken on the machine of this invention and compared with the curves in FIGS. 4c and 4d, respectively, for the same materials as obtained on a machine known as an Instron Tester, operating on fixed lengths of yarn rather than on a continuously travelling yarn. These graphs show that my machine produces results comparable to those of known machines, quite rapidly and while operating on a travelling strand.

In the device as shown in FIG. 1, if the weight 68 be moved to another position during a run, and a second graph be drawn on the record strip R, the average modulus of elasticity may be calculated from the equation:

$$\text{Modulus } ab = \frac{C(F_b - F_a)}{E_b - E_a}$$

wherein (a) and (b) represent respectively the lighter and the heavier loading conditions; $F_a$ and $F_b$ represent the two different loads applied by weight 68; and $E_a$ and $E_b$ represent the elongations under the two different loads. In testing yarns it was found that the modulus was slightly lower than that obtained by standard procedure. For verification of this, fixed loads were placed on yarn samples in the Instron and Incline machines and the elongation was noted at ten second intervals. However, it is believed that the loading as accomplished by this machine, where a constant load is applied to a running strand, is more like that which yarn will encounter in manufacturing processes and, therefore, the modulus as computed from these data is possibly more valuable for some purposes than that computed from conventional stress-strain curves.

I claim:
1. Strand testing apparatus comprising: a first pair of snubbing rolls for feeding a strand past a first point; a second pair of snubbing rolls for feeding the strand past a second point, the rolls in each pair of snubbing rolls being spaced apart and having said strand wound several times about the two rolls, the axes of the two rolls in each pair being horizontal and being inclined to each other to prevent piling of the strand on the rolls, means driving the two rolls of each pair in the same direction of rotation and comprising two vertical drive shafts, one for each pair of rolls, one of said shafts being a driven shaft, a pair of reversely tapered rolls mounted on said two shafts respectively, a belt trained over said tapered rolls for driving the second shaft from said driven shaft, a belt shifter mounted to move said belt vertically on said tapered rolls to vary the speed of rotation of the second pair of snubbing rolls with respect to the first pair of rolls, loop-forming means forming a loop in said strand between said two points and in a vertical plane adjacent said drive shafts, means mounting said loop-forming means for movement vertically in response to changes in size of said loop, loading means for applying an adjustable downward pull on said loop, and a mechanical connection between said belt-shifter and said loop-forming means to effect shifting of said belt upon changes in the length of said loop.

2. Apparatus according to claim 1 wherein the means for mounting said loop-forming means comprises a lever pivoted for movement about a horizontal axis at a point intermediate its ends, said loop-forming means being mounted at one end of said lever, a rod arranged parallel with said lever and spaced laterally therefrom, said rod extending on both sides of said horizontal axis, means supporting said rod from said lever, and said loading means comprising a weight mounted upon said rod for sliding movement along its length to positions on both sides of said horizontal axis.

References Cited in the file of this patent
UNITED STATES PATENTS

| | | |
|---|---|---|
| 317,223 | Sherrell | May 5, 1885 |
| 1,776,514 | Laetsch et al. | Sept. 23, 1930 |
| 1,961,755 | Foster | June 5, 1934 |
| 1,988,544 | Dietz | Jan. 22, 1935 |
| 2,442,150 | Scott | May 25, 1948 |
| 2,632,325 | Norcross | Mar. 24, 1953 |
| 2,693,108 | Eckhardt | Nov. 2, 1954 |

FOREIGN PATENTS

| | | |
|---|---|---|
| 535,023 | Germany | Oct. 6, 1931 |